United States Patent
Koresko (10) Patent No.: US 10,317,285 B2
(45) Date of Patent: Jun. 11, 2019

(54) SYSTEM AND METHOD FOR MEASURING OPTICAL RESOLUTION WITH AN OPTICAL RESOLUTION TARGET ASSEMBLY

(71) Applicant: THE BOEING COMPANY, Chicago, IL (US)

(72) Inventor: Christopher D. Koresko, Uniontown, PA (US)

(73) Assignee: The Boeing Company, Chicago, IL (US)

( * ) Notice: Subject to any disclaimer, the term of this patent is extended or adjusted under 35 U.S.C. 154(b) by 460 days.

(21) Appl. No.: 14/797,520

(22) Filed: Jul. 13, 2015

(65) Prior Publication Data

US 2017/0016771 A1 Jan. 19, 2017

(51) Int. Cl.
*G01N 25/00* (2006.01)
*G01J 5/00* (2006.01)

(52) U.S. Cl.
CPC .................... *G01J 5/0003* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,641,230 A * | 6/1997 | Okubo | .................... | G01N 25/68 356/339 |
| 5,691,542 A * | 11/1997 | Bates | .................... | G01J 5/0003 250/495.1 |
| 5,864,135 A * | 1/1999 | Smith | .................... | G01J 5/522 250/252.1 |
| 6,930,278 B1 * | 8/2005 | Chung | .................... | B23K 26/34 219/121.83 |
| 7,119,337 B1 * | 10/2006 | Johnson | .................... | G01J 3/02 250/339.13 |
| 7,541,121 B2 * | 6/2009 | Ziger | .................... | G03F 7/70516 430/30 |
| 7,564,556 B2 * | 7/2009 | Chang | .................... | G03B 27/28 355/77 |
| 2008/0208499 A1 * | 8/2008 | Miyashita | .................... | G01M 11/0264 702/82 |
| 2009/0027048 A1 * | 1/2009 | Sato | .................... | B82Y 25/00 324/247 |

* cited by examiner

*Primary Examiner* — Lisa M Caputo
*Assistant Examiner* — Nasir U. Ahmed
(74) *Attorney, Agent, or Firm* — The Small Patent Law Group, LLC; Joseph M. Butscher (57) ABSTRACT

A system for testing optical resolution of an optical device includes an optical resolution target assembly including a target that is heated. The target emits a first light beam at a first wavelength in response to being heated. The first light beam has first and second components that are discernible from one another when the target is heated. The system may also include an illuminator that emits light at a second wavelength that differs from the first wavelength onto the target. The target emits a second light beam having third and fourth components that are discernible from one another when the illuminator emits light at the second wavelength onto the target.

20 Claims, 3 Drawing Sheets

SYSTEM AND METHOD FOR MEASURING OPTICAL RESOLUTION WITH AN OPTICAL RESOLUTION TARGET ASSEMBLY

FIELD OF THE DISCLOSURE

Embodiments of the present disclosure generally relate to systems and methods for measuring optical resolution of optical devices with an optical resolution target assembly.

BACKGROUND OF THE DISCLOSURE

Optical resolution targets are used to test resolving power of various optical devices, such as microscopes, cameras, image scanners, and the like. Typically, an optical resolution target is configured for use at a single wavelength, or over a limited range of wavelengths, such as the visible light spectrum.

Various known optical devices may be used in relation to a wide range of wavelengths. For example, night vision devices may be configured for use with respect to the visible light spectrum, as well as an infrared and/or ultraviolet spectrum. However, attempting to use a known optical resolution target to test such optical devices may be cumbersome, difficult, or even impossible. For example, the optical resolution target may provide sufficient contrast in the visible light spectrum, but may provide insufficient contrast with respect to one or more thermal infrared wavelengths.

A known method of testing optical devices that operate over a range of light spectrums includes using separate and distinct optical targets having different properties. Notably, the use of multiple optical targets adds costs and complexity to a testing system and method, while it may also require targets to be removed from and inserted into an optical testing apparatus to adapt for use with different light spectrums. As such, using multiple targets to test an optical device is often costly, complex, time-consuming, and error prone.

Accordingly, a need exists for systems and methods for efficiently testing optical devices that are configured to operate over a wide range of light wavelengths or spectral regions.

SUMMARY OF THE DISCLOSURE

Certain embodiments of the present disclosure provide a system for testing optical resolution of an optical device. The system may include an optical resolution target assembly including a target that is to be heated. The target emits a first light beam at a first wavelength in response to being heated. The first light beam has first and second components (for example, a first wavelength component indicative of a substrate, and a first wavelength component indicative of one or more patterns on the substrate) that are discernible from one another when the target is heated. The system may also include an illuminator that emits light at a second wavelength that differs from the first wavelength onto the target. The target emits a second light beam having third and fourth components (for example, a second wavelength component indicative of a substrate, and a second wavelength component indicative of one or more patterns on the substrate) that are discernible from one another when the illuminator emits light at the second wavelength onto the target.

The optical resolution target assembly may include a target temperature controller coupled to the target. The target temperature controller controls a temperature of the target and may include a temperature adjuster coupled to the target. The temperature adjuster heats and/or cools the target. For example, the target temperature controller controls activation of a heating element based on a detected temperature of the target, resulting in variation of the temperature of the target. The target temperature controller may also include a temperature sensor coupled to the target. The temperature sensor detects the temperature of the target. The target temperature controller may also include at least one processor including hardware and software operatively coupled to the temperature adjuster and the temperature sensor. The processor(s) executes a set of instructions stored in at least one memory to control the temperature adjuster based on the temperature detected by the temperature sensor. The temperature adjuster may include, for example, a resistive heater or a thermoelectric cooler, while the temperature sensor may include, for example, a thermistor or a thermocouple.

The optical resolution target assembly may also include a support plate (such as a high thermal conductivity plate) disposed between the target and the target temperature controller. The support plate evenly distributes heat onto or into the target.

The target may include a substrate, and one or more patterns formed on the substrate. In at least one embodiment, the substrate or the patterns) may be formed of glass, while the other of the substrate and the pattern(s) may be formed of chromium. The substrate exhibits a first emissivity, and the pattern(s) exhibit a second emissivity. The first emissivity differs from the second emissivity.

In at least one embodiment, the first wavelength may include a thermal infrared wavelength. The second wavelength may include a visible light wavelength.

The system may also include a collimating mirror having a reflecting surface, and a background plate including a reflected surface. A light path may be formed between the reflected surface, the target, the reflecting surface, and the optical device.

Certain embodiments of the present disclosure provide a method for testing optical resolution of an optical device. The method may include heating a target of an optical resolution target assembly, and emitting a first light beam at a first wavelength from the target in response to the heating operation. The first light beam may include first and second components that are discernible from one another in response to the heating operation. The method may also include emitting light at a second wavelength that differs from the first wavelength onto the target, and emitting a second light beam having third and fourth components that are discernible from one another in response to the emitting light at the second wavelength operation. The heating operation may include detecting a temperature of the target, and controlling the temperature of the target based on the detecting operation.

Certain embodiments of the present disclosure provide an optical resolution target assembly that is used to test optical resolution of an optical device. The optical resolution target assembly may include a target having a substrate and one or more patterns. The substrate exhibits a first emissivity. The pattern(s) exhibit a second emissivity. The first emissivity differs from the second emissivity. The optical resolution target assembly may also include a target temperature controller that controls a temperature of the target. The target temperature controller heats the target. The target emits a first light beam at a first wavelength in response to being heated. The first light beam has first and second components that are discernible from one another when the target is heated. The target emits a second light beam having third and fourth components that are discernible from one another when light at a second wavelength that differs from the first wavelength impinges the target.

Each Figure shown in this disclosure shows a variation of an aspect of the embodiments presented, and only differences will be discussed in detail.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide an optical resolution target assembly that is configured to allow for detection of a resolution, such as an angular resolution, of an imaging device. The imaging device may be configured to operate at a wide range of light wavelengths or spectral regions, such as thermal infrared wavelengths, visible light wavelengths, and ultraviolet wavelengths. In at least one embodiment, the optical resolution target assembly is configured to be used to detect different physical phenomena at first (for example, long) and second (for example, short) wavelengths, thereby allowing discernment of image features that are visible over a wide range of wavelengths. Therefore, the optical resolution target assembly may be used to test optical devices, such as fused sensor systems, which are configured to operate simultaneously or sequentially over first wavelength spectrums (such as ultraviolet through near-infrared) and second wavelength spectrums (such as thermal-infrared wavelengths) that differ from the first wavelength spectrums.

In at least one embodiment, the optical resolution target assembly includes a resolution target (for example, a USAF 1951 pattern printed in chrome on a glass substrate) which provides contrast in both reflectivity at short wavelengths (such as ultraviolet through near-infrared wavelengths) and in emissivity at long wavelengths (such as thermal infrared). A system may include the optical resolution target assembly, an optically diffuse background plate, such as backing screen, and one or more light sources such as lasers, light emitting diodes (LEDs), hot-filament light bulbs, and hot plates.

Certain embodiments of the present disclosure provide a system for testing an optical device. The system may include an optical resolution target assembly placed at a focus of the optical device that is being tested. At first or short wavelengths (such as ultraviolet or near-infrared wavelengths) the target is visible to the optical device as a pattern of light and dark features because light from a selected source passes through non-printed (for example, blank) areas of a substrate of the optical resolution target assembly and is reflected toward the optical device, whereas the light that strikes a printed area on the substrate is absorbed or reflected in a direction away from the optical device. At thermal infrared wavelengths, the external light sources may be deactivated, and the substrate may be heated or cooled, and light may be emitted directly by the target. The non-printed areas of the target have a different (higher in the case of a chrome-on-glass target) emissivity than the printed areas and therefore appear to the optical device as having different (for example, increased) brightness. The lower emissivity areas may be smooth, and may provide specular reflectors (for example, mirrors), in which case they may be arranged so that they reflect a high-emissivity but cooler source, such as a background plate. Alternatively the lower emissivity areas may be left to reflect ambient temperature surroundings. Accordingly, the same physical target may be used at both thermal infrared and at shorter (for example, near-infrared to ultraviolet) wavelengths.

Because the optical resolution target assembly may be positioned at the focus of the optical device, there is no need to perform mechanical insertion and removal of separate and distinct optical targets to change wavelengths when testing fused short-wavelength and thermal IR imaging systems. Further, the use of a single optical target assembly allows for straightforward, simple, and easy testing of an optical device.

Figure 1:
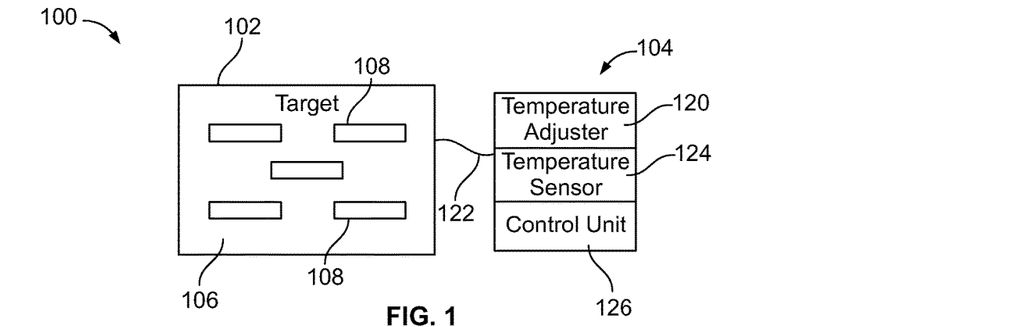
FIG. 1 illustrates a schematic block diagram of an optical resolution target assembly, according to an embodiment of the present disclosure.

FIG. 1 illustrates a schematic block diagram of an optical resolution target assembly 100, according to an embodiment of the present disclosure. The optical resolution target assembly 100 may include a target 102 that may be coupled to a target temperature controller 104, such as through one or more wired or wireless connections.

The target 102 may include a substrate 106 that is blank or non-printed. One or more patterns 108 may be formed on the substrate 106. For example, the patterns 108 may be printed areas that are formed on the substrate 106, such as through etching, vapor deposition, and/or the like. Alternatively, the substrate 106 may be a printed substrate, and the patterns 108 may be non-printed areas on the substrate 106.

In at least one embodiment, the substrate 106 may be formed of glass, while the patterns 108 may be formed of chromium placed over the substrate 106. Alternatively, the printed areas of the target 102 (for example, the patterns 108) may be formed of various other materials, such as gold, copper, silver, paint, ink, and/or the like. In short, the emissivity of the substrate 106 and that of the patterns 108 differs. Notably, emissivity relates to the ability of a surface to emit radiant energy (such as when the surface is heated).

Figure 2:
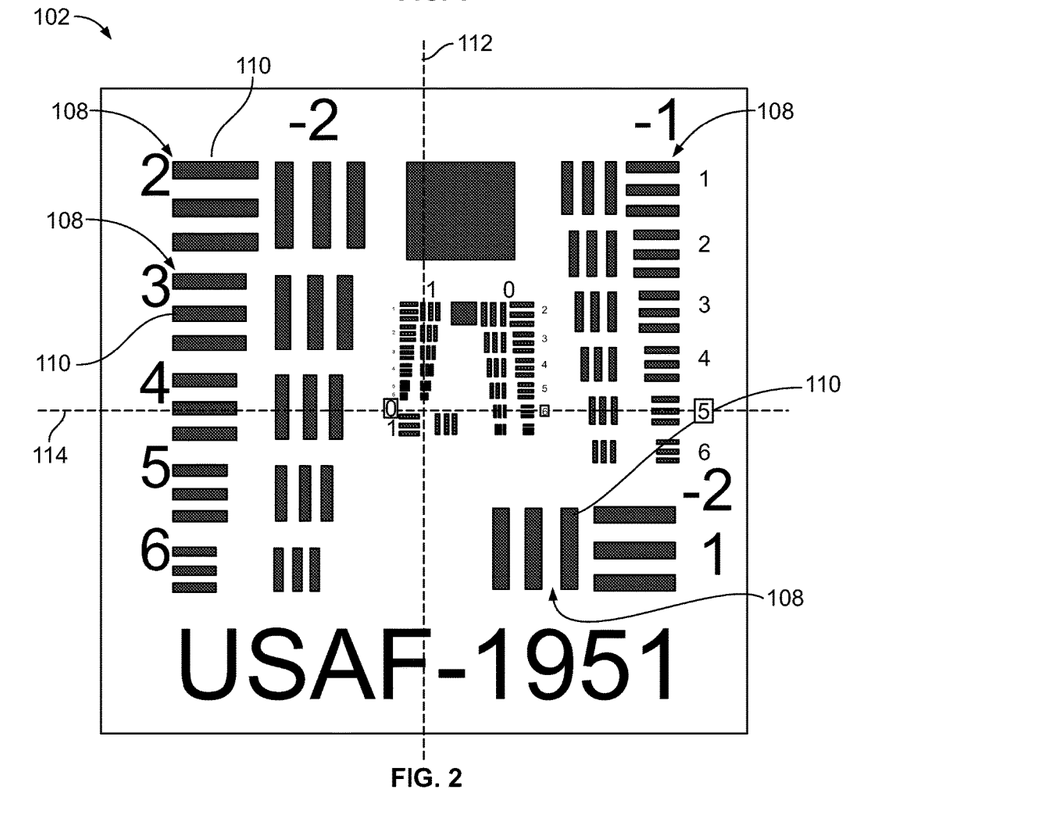
FIG. 2 illustrates a front view of a target, according to an embodiment of the present disclosure.

FIG. 2 illustrates a front view of the target 102, according to an embodiment of the present disclosure. The target 102 may include a 1951 United States Air Force (USAF) resolution test chart. The target 102 may be used to test resolving power of optical devices, such as microscopes, cameras, image scanners, night vision cameras/goggles, and the like.

As shown, each pattern 108 may include groups of three bars 110 that vary in thickness. For example, one group of bars 110 may include a first thickness, while another group of bars 110 may include a second thickness that differs from the first thickness. Further, as shown, a first group of bars 110 may be oriented differently than another group of bars 110. For example, one group of bars 110 may be parallel with a longitudinal axis 112 of the target 102, while another group of bars 110 may be parallel with a lateral axis 114 that is perpendicular to the longitudinal axis 112. In general, the largest bar a particular optical device is unable to discern represents the limitation of the resolving power of the optical device.

The patterns 108 may be formed of chromium, for example. The substrate 106 may be formed of glass. While FIG. 2 shows that the target 102 may include a 1951 USAF resolution test chart, it is to be understood that the target 102 may be or include various other types of test charts. The arrangement of patterns 108 and bars 110 shown in FIG. 2 is merely exemplary.

Referring again to FIG. 1, the target temperature controller 104 may be coupled to the target 102 and configured to vary a temperature of the target 102. The target temperature controller 104 may include a temperature adjuster 120 that is coupled to the target 102. For example, the temperature adjuster 120 may be a resistive heater, a thermoelectric cooler, or the like that may be operatively coupled to the target 102 through one or more leads 122. The temperature adjuster 120 is configured to vary the temperature of the target 102 based on a sensed temperature.

The target temperature controller 104 may also include a temperature sensor 124, such as a thermometer, thermistor, thermocouple, or the like that may be operatively coupled to the target 102, such as through the lead(s) 122. The temperature sensor 124 is configured to detect a temperature of the target 102.

A control unit 126 may be in communication with the temperature adjuster 120 and the temperature sensor 124. The control unit 126 is configured to receive temperature signals from the temperature sensor 124. Based on the received temperature signal(s), the control unit 126 operates the temperature adjuster 120 to adjust (for example, heat or cool) the temperature of the target 102 to a desired temperature. In this manner, the control unit 126 may monitor and adjust the temperature of the target 102. Alternatively, instead of a processor-based control unit 126, the target temperature controller 104 may include an analog servo system or circuit.

The target temperature controller 104 may include more or less components than shown. For example, in at least one embodiment, the target temperature controller 104 may not include the control unit 126. Instead, the temperature adjuster 120 may be operated to adjust the temperature of the target 102 without a control unit monitoring and automatically adjusting the temperature. Also, alternatively, the target temperature controller 104 may not include the temperature sensor 124.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms.

The control unit 126, for example, is configured to execute a set of instructions that are stored in one or more storage elements (such as one or more memories), in order to process data. For example, the control unit 126 may include or be coupled to one or more memories. The storage elements may also store data or other information as desired or needed. The storage elements may be in the form of an information source or a physical memory element within a processing machine.

The set of instructions may include various commands that instruct the control unit 126 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units. It is to be understood that the processing or control units may represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control units may represent processing circuitry such as one or more of a field programmable gate array (FPGA), application specific integrated circuit (ASIC), microprocessor(s), a quantum computing device, and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 3:
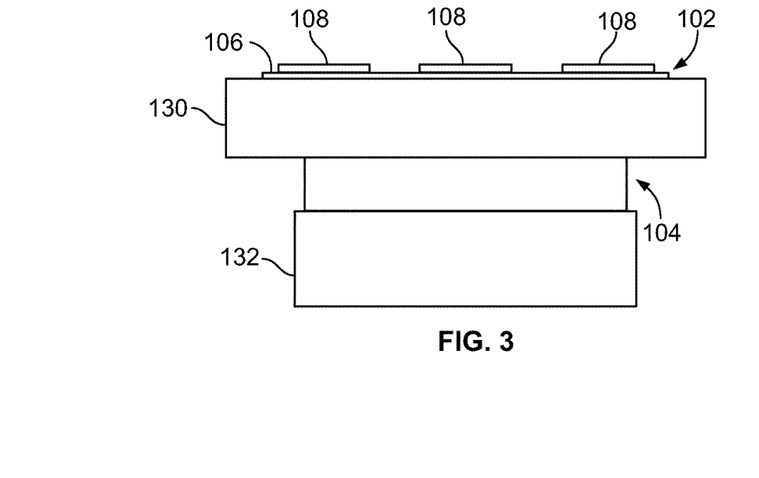
FIG. 3 illustrates a top view of an optical resolution target assembly, according to an embodiment of the present disclosure.

FIG. 3 illustrates a top view of the optical resolution target assembly 100, according to an embodiment of the present disclosure. As noted, the optical resolution target assembly 100 may include the target 102 operatively coupled to the target temperature controller 104. As shown, the target temperature controller 104 may be mounted to the target 102, such as through a support plate 130, which may be formed of a heat-conducting material, such as copper.

Alternatively, the optical resolution target assembly 100 may not include the support plate 130. Instead, the target temperature controller 104 may mount directly to a rear surface of the target 102.

Also, alternatively, the target temperature controller 104 may not be mounted to the target 102. For example, the target temperature controller 104 may be remotely located from the target 102. In such an embodiment, the target temperature controller 104 may be connected to the target 102 through one or more leads or other wired connections.

A heat sink 132 may be connected to the target temperature controller 104. The heat sink 132 may be used to dissipate heat generated by the target temperature controller 104 and/or the target 102. Optionally, the optical resolution target assembly 100 may not include the heat sink 132.

As shown, the target temperature controller 104 is configured to adjust the temperature of the target 102 such as through heating or cooling. As noted, the target temperature controller 104 may include a temperature adjuster 120 (such as a resistive heater, a thermoelectric cooler, an electric heater, or the like), shown in FIG. 1, that is configured to adjust the temperature of the substrate 106 through the support plate 130 (such as a high thermal conductivity plate). The support plate 130 provides a uniform surface temperature for the substrate 106. That is, the support plate 130 may be configured to distribute heat generated by the temperature adjuster 120 evenly over a surface of the substrate 106. Although, as noted above, in at least one embodiment, the optical resolution target assembly 100 may not include the support plate 130.

The substrate 106 may include a surface that exhibits high emissivity at thermal infrared wavelengths. The emissivity of the substrate 106 differs from that of the patterns 108. For example, the emissivity of the substrate 106 may be greater than that of the patterns 108, or vice versa.

In operation, as the target temperature controller 104 raises the temperature of the substrate 106, the brightness of the substrate 106 as seen by an imaging device (such as a thermal camera) increases. In contrast, the emissivity of the patterns 108 may be lower than that of the substrate 106. As such, as the brightness of the substrate 106 increases with increasing temperature, the brightness of the patterns 108 may not increase, or may increase at a lower rate than that of the substrate 106. In this manner, the brightness of the substrate 106 and the patterns 108 differ and provide contrast therebetween as the temperature of the substrate 106 increases.

In at least one embodiment, a ring of thermal insulation may be placed around a periphery of the support plate 130. The thermal insulation is configured to provide uniform surface temperatures over a surface area of the support plate 130. In at least one embodiment, one or more light baffles may be used to suppress stray light.

Figure 4:
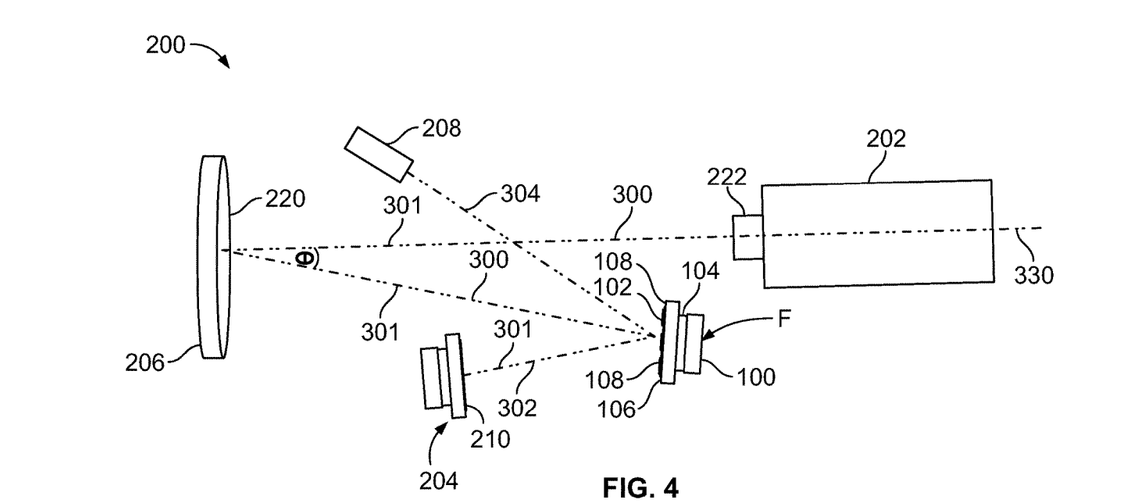
FIG. 4 illustrates a top view of a system for testing optical resolution of an optical device, according to an embodiment of the present disclosure.

FIG. 4 illustrates a top view of a system 200 for testing optical resolution of an optical device 202, according to an embodiment of the present disclosure. The system 200 may include the optical resolution target assembly 100, a background plate 204, a collimating mirror 206, and a visible light illuminator 208, such as a flashlight, spotlight, laser(s), one or more light emitting diodes (LEDs), hot-filament light bulbs, hot plates and/or the like.

The background plate 204 may be configured similar to the optical resolution target assembly 100, except that the background plate 204 may not include patterns formed on a target. Instead, the background plate 204 may include a reflected surface 210 instead of the target 102. The reflected surface 210 may include a glass surface that is sprayed with black paint or covered with lampblack paint, for example. The reflected surface 210 may be configured to be dark at visible wavelengths, and exhibit high emissivity at thermal infrared wavelengths, for example.

The optical device 202 may be of various types, such as an image scanner, night vision goggles, a telescope, a periscope, and/or the like. The optical device 202 may be configured to image objects at infinity. The system 200 may be configured to simulate imaging of objects at infinity. The collimating mirror 206 may cause the optical resolution target assembly 100 to appear to be at infinity.

In operation, the optical device 202 is operated at one or more first wavelengths (such as thermal infrared wavelengths). During operation of the optical device 202 at the first wavelength(s), the visible light illuminator 208 may be deactivated. Because the substrate 106 is warmed by the target temperature controller 104, the substrate 106 emits thermal radiation or energy (for example, a light beam at a thermal infrared wavelength) and appears bright to the optical device 202. The target 102 emits a light beam 300 at the first wavelength(s) that reflects off a reflecting surface 220 of the mirror 206 at an angle $\theta$ and is received by an aperture 222 of the optical device 202. The light beam 300 may include a substrate component and a pattern component. The substrate component and the pattern component are discernible (for example, contrasted with respect to one another) due to the different emissivities thereof. For example, the substrate component may be brighter than the pattern component, or vice versa, due to the heating of the target 102 by the target temperature controller 104.

As shown, a light path 301 is formed between the reflected surface 210 to the target 102, the reflecting surface 220, and the aperture 222 of the optical device. 202. In at least one embodiment, as the target 102 is heated, the substrate 106 (which may be formed of glass) appears bright to the optical device 202, while the patterns 108 (which may be formed of chromium, which has a lower emissivity than glass) act as a mirror that reflects a reflecting beam 302 having a dark surface of the high-emissivity reflected surface 210 of the of the background plate 204. As such, the light beam 300 received by the optical device 202 may include a light pattern on a dark background. Accordingly, the light beam 300 may include the substrate portion, such as the bright portion of the substrate, and the pattern portion, such as the reflecting beam 302 reflected off the patterns 108.

Alternatively, the system 200 may not include the background plate 204. Instead, the brightness of the substrate portion may be discerned and contrasted from the patterns 108 due to differences in emissivity.

In order to test the optical device 202 at one or more second wavelengths (such as visible light wavelengths) that differ from the first wavelength(s), the optical device 202 is operated in relation to the second wavelength(s). The visible light illuminator 208 is then activated to emit a visible light beam 304 onto the target 102. The substrate 106 may be formed of glass, and, as such, is transparent to the visible light beam 304. Accordingly, the optical device 202 receives a light beam that includes the color and brightness of material behind the substrate 106. At the same time, the patterns 108 act as mirrors so that the optical device 202 receives a portion of a light beam that reflects the dark surface of the background plate 204. Accordingly, the image seen by the optical device may be a dark pattern on a light background.

As shown, the optical resolution target assembly 100 may be positioned so as not to interfere with a light path between the mirror 206 and the aperture 222. Similarly, the background plate 204 may be positioned so that the aperture 222 may receive a light beam that may be reflected from the reflected surface 210, off the target 102, and onto the reflecting surface 220. The components shown in FIG. 4 may be positioned at various distances and angular positions other than shown. It is to be understood that the orientation and angles shown in FIG. 4 are merely exemplary.

The optical resolution target assembly may be placed at a focus F (for example, focal point) of the optical device 202. Notably, the mirror 206 is configured to angle the focus F in relation to the optical device 202 (so that the focus F may not be positioned along a line that is aligned with a longitudinal axis 330 of the optical device 202). At short wavelengths (such as ultraviolet, visible, or near-infrared wavelengths) the target 102 may be visible to the optical device 202 as a pattern of light and dark features because light from the illuminator 208 passes through non-printed portions of substrate 106 and is reflected toward the optical device 202, whereas the light that strikes the printed areas (for example, the patterns 108) may be absorbed or reflected.

At thermal infrared wavelengths, the illuminator 208 may be deactivated, and a temperature of the substrate 106 may be varied (such as through heating or cooling), and light may be emitted directly by the target 102. The non-printed areas (for example, the glass areas of the substrate 106) of the target 102 have a different emissivity than the printed areas (for example, the patterns 108, which may be formed of chromium) and therefore appear to the optical device 202 as having a different brightness.

Because the optical resolution target assembly 100 may be positioned at the focus F of the optical device 202, there is no need to perform mechanical insertion and removal of separate and distinct optical targets when testing fused short-wavelength and thermal infrared imaging systems. Further, the use of the single optical target assembly 100 (in contrast to a first target configured for a first wavelength and a separate and distinct second target configured to a second wavelength) allows for straightforward, simple, and easy testing of an optical device.

As noted above, the first wavelength may be a thermal infrared wavelength, while the second wavelength may be a visible light wavelength. It is to be understood, however, that the terms first and second are used to indicate two separate and distinct wavelengths or spectrums of wavelengths. As such, the first wavelength may be the visible light wavelength, while the second wavelength may be the thermal infrared wavelength.

Figure 5:
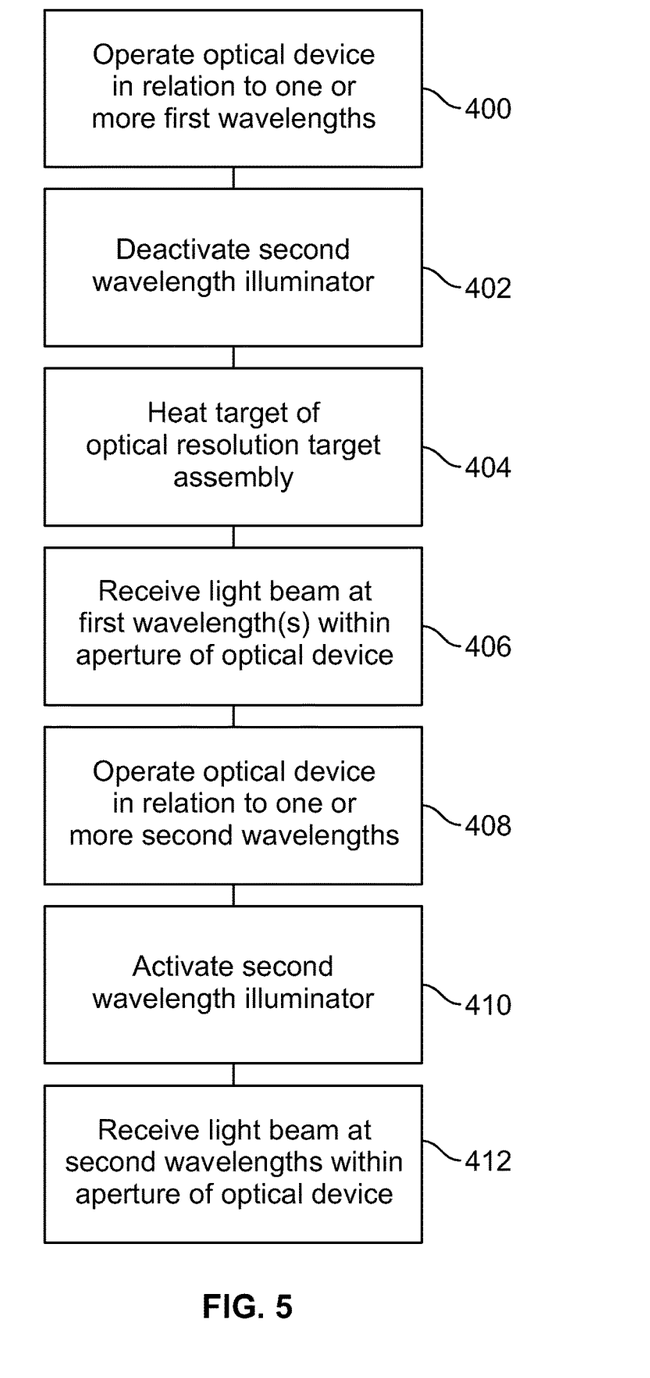
FIG. 5 illustrates a flow chart of a method for testing optical resolution of an optical device, according to an embodiment of the present disclosure.

FIG. 5 illustrates a flow chart of a method for testing optical resolution of an optical device, according to an embodiment of the present disclosure. At 400, the optical device is operated in relation to one or more first wavelengths. The first wavelength(s) may be, for example, thermal infrared wavelengths. At 402, a second wavelength illuminator, such as a visible light illuminator, is deactivated. At 404, a target of an optical resolution target assembly is heated. Then, at 406, a light beam at the first wavelength is received within an aperture of the optical device from a mirror that received the light beam from a target of the optical resolution target assembly.

At 408, the optical device is operated in relation to one or more second wavelengths. The second wavelength(s) may be, for example, visible light wavelengths (for example, R-O-Y-G-B-I-V). At 410, the second wavelength illuminator is activated and emits a light beam that reflects off the target of the optical resolution target assembly onto the mirror and into the optical device. At 412, the light beam at the second wavelength(s) is received within the aperture of the optical device.

As described above, embodiments of the present disclosure provide an optical resolution target assembly that is configured to allow an optical device to be tested in relation to different light spectrums, such as first and second wavelengths that differ from one another. Embodiments of the present disclosure provide systems and methods for efficiently testing optical devices that are configured to operate over a wide range of light wavelengths.

Embodiments of the present disclosure provide an optical resolution target assembly that is configured to be used in conjunction with testing an optical device with respect to a first light spectrum, such as a visible light spectrum, and a second light spectrum that differs from the first light spectrum. For example, the second light spectrum may be a thermal infrared spectrum.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for testing optical resolution of an optical device, the system comprising:
an optical resolution target assembly including a target and a target temperature controller mounted to the target through a support plate, wherein the target is heated by the target temperature controller, wherein heating of the target by the target temperature controller causes the target to emit a first light beam at a first wavelength, and wherein the first light beam has first and second components that are discernible from one another when the target is heated; and
an illuminator that, when activated, emits light at a second wavelength that differs from the first wavelength onto the target, wherein the target emits a second light beam having third and fourth components that are discernible from one another when the illuminator emits light at the second wavelength onto the target.

2. The system of claim 1, wherein the target temperature controller controls a temperature of the target and comprises:
a temperature adjuster coupled to the target, wherein the temperature adjuster one or both of heats or cools the target;
a temperature sensor coupled to the target, wherein the temperature sensor detects the temperature of the target; and
at least one processor operatively coupled to the temperature adjuster and the temperature sensor, wherein the at least one processor executes a set of instructions stored in at least one memory to control the temperature adjuster based on the temperature detected by the temperature sensor.

3. The system of claim 2, wherein the temperature adjuster comprises a resistive heater or a thermoelectric cooler, and wherein the temperature sensor comprises a thermistor or a thermocouple.

4. The system of claim 1, wherein the optical resolution target assembly further comprises a support plate disposed between the target and the target temperature controller.

5. The system of claim 1, wherein the target comprises:
a substrate; and
one or more patterns formed on the substrate.

6. The system of claim 5, wherein the substrate or the one or more patterns is formed of glass, and wherein the other of the substrate or the one or more patterns is formed of chromium.

7. The system of claim 5, wherein the substrate exhibits a first emissivity, and wherein the one or more patterns exhibit a second emissivity, wherein the first emissivity differs from the second emissivity.

8. The system of claim 1, wherein the first wavelength comprises a thermal infrared wavelength, and wherein the second wavelength comprises a visible light wavelength.

9. The system of claim 1, further comprising:
a collimating mirror having a reflecting surface; and
a background plate including a reflected surface, wherein a light path is formed between the reflected surface, the target, the reflecting surface, and the optical device.

10. The system of claim 1, wherein the optical resolution target assembly is at a focus of the optical device.

11. The system of claim 10, further comprising:
a background plate including a reflected surface, wherein the reflected surface is configured to be dark at visible wavelengths and exhibit high emissivity at thermal infrared wavelengths;
a collimating mirror including a reflecting surface; and
a visible light illuminator that is configured to emit a visible light beam onto the target,
wherein a first light path is formed between the reflected surface to the target, the reflecting surface, and an aperture of the optical device, wherein a second light path is formed between the visible light illuminator and the target, and wherein the second light path differs from the first light path.

12. The system of claim 11, wherein the visible light illuminator is deactivated when the optical device is operated at the first wavelength.

13. The system of claim 11, wherein the collimating mirror is configured to angle the focus away from a longitudinal axis of the optical device.

14. A method for testing optical resolution of an optical device, the method comprising:
heating a target of an optical resolution target assembly by a target temperature controller mounted to the target through a support plate;
emitting a first light beam at a first wavelength from the target due to the heating the target by the target temperature controller, wherein the first light beam includes a first component and a second component that are discernible from one another in response to the heating the target;
activating an illuminator;
emitting light at a second wavelength that differs from the first wavelength from the illuminator onto the target due to the activating; and
emitting a second light beam having a third component and a fourth component that are discernible from one another in response to the emitting light at the second wavelength.

15. The method of claim 14, wherein the heating the target comprises:
detecting a temperature of the target; and
controlling the temperature of the target based on the detecting the temperature.

16. The method of claim 14, wherein a substrate of the target exhibits a first emissivity, and wherein one or more patterns of the target exhibit a second emissivity, wherein the first emissivity differs from the second emissivity.

17. The method of claim 14, wherein the first wavelength comprises a thermal infrared wavelength, and wherein the second wavelength comprises a visible light wavelength.

18. The method of claim 14, further comprising forming a light path between a reflected surface, the target, a reflecting surface, and the optical device.

19. An optical resolution target assembly to test optical resolution of an optical device, the optical resolution target assembly comprising:
a target having a substrate and one or more patterns, wherein the substrate exhibits a first emissivity, wherein the one or more patterns exhibit a second emissivity, wherein the first emissivity differs from the second emissivity, wherein the substrate or the one or more patterns is formed of glass, and wherein the other of the substrate or the one or more patterns is formed of chromium; and
a target temperature controller mounted to the target through a support plate, wherein the target temperature controller controls a temperature of the target, wherein the target temperature controller controls heating of the target, wherein the target is heated by the target temperature controller, wherein heating of the target by the target temperature controller causes the target to emit a first light beam at a first wavelength, and wherein the first light beam has first and second components that are discernible from one another when the target is heated, wherein the target emits a second light beam having third and fourth components that are discernible from one another when light at a second wavelength that differs from the first wavelength impinges the target.

20. The optical resolution target assembly of claim 19, wherein target temperature controller comprises:
- a temperature adjuster coupled to the target, wherein the temperature adjuster one or both of heats or cools the target;
- a temperature sensor coupled to the target, wherein the temperature sensor detects the temperature of the target; and
- at least one processor operatively coupled to the temperature adjuster and the temperature sensor, wherein the at least one processor executes a set of instructions stored in at least one memory to control the temperature adjuster based on the temperature detected by the temperature sensor.

* * * * *